(12) United States Patent
Taketani et al.

(10) Patent No.: US 7,092,243 B2
(45) Date of Patent: Aug. 15, 2006

(54) NIOBIUM SOLID ELECTROLYTIC CAPACITOR

(75) Inventors: Yutaka Taketani, Daito (JP); Yoshiaki Hasaba, Shijonawate (JP); Makoto Sakamaki, Daito (JP); Tadahito Ito, Neyagawa (JP)

(73) Assignees: Sanyo Electric Co., Ltd., Moriguchi (JP); Sun Electronic Industries Corp., Shijonawate (JP)

( * ) Notice: Subject to any disclaimer, the term of this patent is extended or adjusted under 35 U.S.C. 154(b) by 0 days.

(21) Appl. No.: 10/934,406

(22) Filed: Sep. 7, 2004

(65) Prior Publication Data
US 2005/0141174 A1 Jun. 30, 2005

(30) Foreign Application Priority Data
Sep. 12, 2003 (JP) .............. P. 2003-320614

(51) Int. Cl.
*H01G 9/00* (2006.01)
*H01K 5/00* (2006.01)

(52) U.S. Cl. ............................. 361/539; 29/25.03

(58) Field of Classification Search ........... 361/523, 361/532–539; 29/25.03
See application file for complete search history.

(56) References Cited

U.S. PATENT DOCUMENTS

| 4,017,773 | A | * | 4/1977 | Cheseldine | 361/532 |
| 4,488,204 | A | * | 12/1984 | Beck, Jr. | 361/540 |
| 6,036,734 | A | * | 3/2000 | Taketani et al. | 29/25.03 |
| 6,333,844 | B1 | * | 12/2001 | Nakamura | 361/523 |
| 6,791,822 | B1 | * | 9/2004 | Kochi et al. | 361/523 |
| 2001/0028544 | A1 | * | 10/2001 | Sano et al. | 361/301.3 |
| 2004/0027789 | A1 | * | 2/2004 | Kochi et al. | 361/523 |

FOREIGN PATENT DOCUMENTS

JP 8-148392 6/1996

* cited by examiner

*Primary Examiner*—Eric W. Thomas
(74) *Attorney, Agent, or Firm*—Armstrong, Kratz, Quintos, Hanson & Brooks, LLP.

(57) ABSTRACT

A solid electrolytic capacitor constituted by forming a dielectric coating film, a solid state electrolyte layer, and cathode lead-out layer in order on the surface of an anode body including niobium or an alloy containing niobium as the main component to an end of which an anode lead member is implanted to construct a capacitor element, connecting the anode lead member with an anode terminal and connecting the cathode lead-out layer, at the same time, with a cathode terminal, and being covered and sealed by a sheath resin, in that the sheath resin is formed by injecting and filling liquid silicone resin and heat curing molding the same.

5 Claims, 2 Drawing Sheets

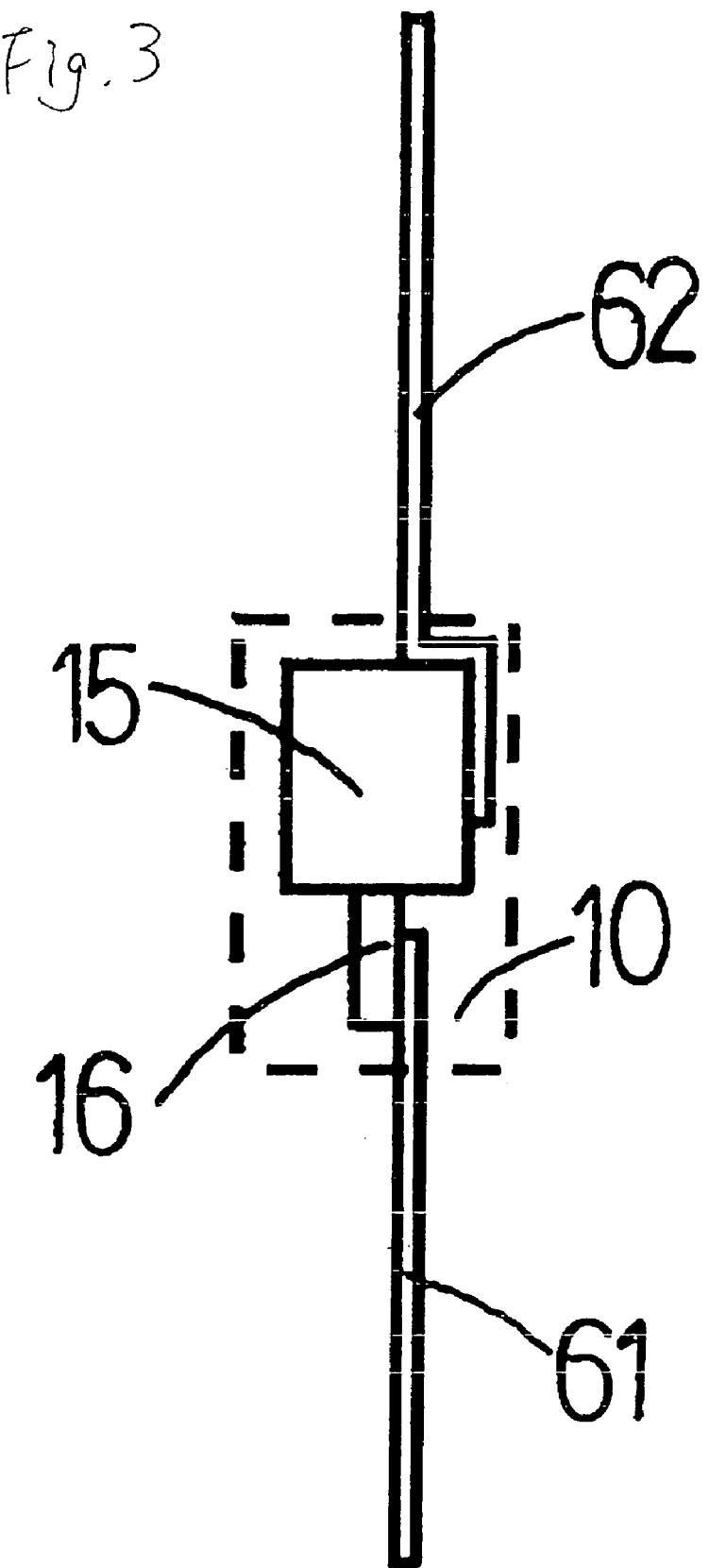

NIOBIUM SOLID ELECTROLYTIC CAPACITOR

BACKGROUND OF THE INVENTION

The present invention relates to a resin mold-type solid electrolytic capacitor using niobium or an alloy containing niobium as the main component as an anode member.

Nowadays, as an anode body of an electrolytic capacitor, a winding of surface-roughened aluminum foil, a single layer body or multilayer body of a surface-roughened aluminum thin plate, a porous sintered body of tantalum powder and the like are frequently used. As material of the anode body, niobium also comes under the spotlight. Niobium is a metal belonging to the same group, i.e., 5A, as tantalum in the periodic table of the elements and having physical properties similar to those of tantalum, has many advantages such as a smaller specific gravity, a larger amount of reserves in the earth crust and a lower kg unit cost compared with tantalum. Therefore, trials to utilize niobium as an anode member of an electrolytic capacitor have been done. However, there were many problems in the case of an electrolytic capacitor using niobium as an anode member that a leakage current (LC) tended to become large, an aging treatment (an operation for insulating a defective portion of a dielectric oxide film by applying a direct-current voltage according to the polarity of a capacitor for a long period of time) for reducing the leakage current did not achieve easily a desired effect, and a value of capacitance was apt to vary depending on a direct-bias voltage, which problems were impossible to be solved by converting simply the technique employed when tantalum was used as the anode body. These problems have been gradually overcome through many studies and improvements. However, the final production step, that is, a forming (hereinafter, referred to as molding) step is also faced with a large problem.

Nowadays, many capacitors using a tantalum sintered body as an anode body are produced. The capacitor is constructed by forming a dielectric coating film, a solid state electrolyte layer, and cathode lead-out layer in order on the surface of the anode body made of the tantalum sintered body, connecting an anode lead member implanted to an end of the anode body with an anode terminal, connecting the cathode lead-out layer with a cathode terminal, and coating and sealing by a sheath resin.

Here, at the step of forming the sheath resin, the sheath resin is formed by so called injection molding, in which the capacitor is set in a sheath mold, solid epoxy resin and the like is molten, for example, by heating at about 180° C., the molted resin is pressed into a cavity provided concavely in the mold with a high pressure of around 100 atm and the temperature is kept for several minutes to cure thermally. Then, it is taken out of the mold, subjected to postcure when required, and subjected to a well-known aging by applying voltage to be completed. The injection molding has such an advantage that it allows to produce easily a molded part having a high dimensional accuracy.

However, since an injection pressure at injection molding is large, the dielectric coating film on the surface of the anode body is injured due to a mechanical damage at the injection molding to result in an increase in the leakage current supposedly caused by this.

As a conventional technique to solve the problem, a method is proposed, in which a cushioning material formed of synthetic fiber, rubber, paper, cloth or the like is provided only on the opposite face of a gate of the mold by injection molding to buffer an injection pressure of the molten resin. (For example, refer to JP-A-8-148392)

However, when a capacitor element using an anode body with niobium as the main component is molded by the same method as that for the tantalum element, the finished capacitor often has been heavily deteriorated, can not be repaired sufficiently by being subjected to a well known aging by applying a voltage at high temperatures and decreased in the leakage current to a practical level. Further, even when a capacitor having satisfactory initial properties can be obtained by applying less severe conditions during molding, the capacitor element receives a destructive damage by a solder heat resistance test (EIAJ RC-2378, corresponding to 250° C.), which can not be repaired even when the aging is conducted.

The cause is attributed to a low mechanical and thermal strength of the niobium element. That is, in addition to a mechanical damage caused by violent collision of a heat-molten resin having an extremely high viscosity with a high pressure of around 100 atm to the niobium sintered body having a slightly inferior mechanical strength because of its melting point lower than that of tantalum by 520° C., there is such a weak point peculiar to niobium that a oxidized niobium film being a dielectric coating film generates disturbance of atomic level at high temperatures of the solder heat resistance test.

Further, instead of a conventional lead solder, a lead-free solder, which gives a less adverse affect to the environment, has been used. However, since the lead-free solder has a higher melting point compared with the lead solder, there is a problem that the capacitor properties deteriorate much when a capacitor using an anode body containing niobium as the main component is subjected to soldering by using the lead-free solder.

SUMMARY OF THE INVENTION

The invention provides a niobium solid electrolytic capacitor with an excellent solder heat resistance, wherein a solid electrolytic capacitor element using niobium having inferior mechanical and thermal properties to those of tantalum as described above can be injection-molded with little degradation.

According to the invention, a solid electrolytic capacitor constituted by forming a dielectric coating film, a solid state electrolyte layer, and a cathode lead-out layer in order on the surface of an anode body comprising niobium or an alloy containing niobium as the main component to an end of which an anode lead member is implanted to construct a capacitor element, connecting the anode lead member with an anode terminal and connecting the cathode lead-out layer, at the same time, with a cathode terminal, and being covered and sealed by a sheath resin, wherein the sheath resin is formed by injecting and filling liquid silicone resin and heat curing molding the same.

By employing the aforementioned means, degradation of niobium at injection molding can be prevented to allow to provide a niobium solid electrolytic capacitor having good capacitor properties. In addition, even when a lead-free solder having a melting point higher than that of a lead solder is used, good capacitor properties are obtained.

BRIEF DESCRIPTION OF THE DRAWINGS

FIG. 3 is a side view of the solid electrolytic capacitor at the injection molding step.

DETAILED DESCRIPTION OF THE PREFERRED EMBODIMENTS

Figure 1:
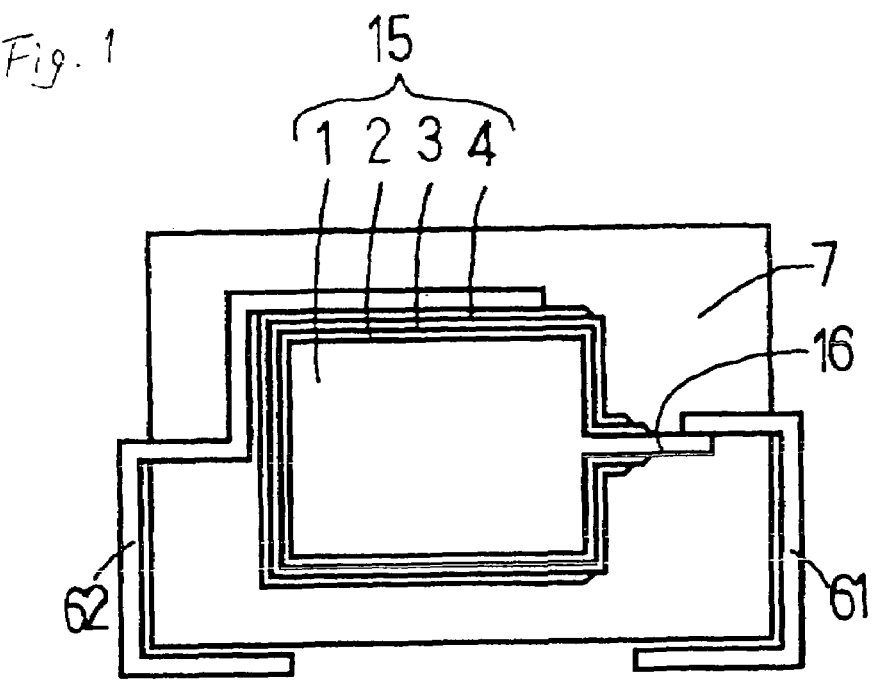
FIG. 1 is a longitudinal sectional view of a solid electrolytic capacitor using niobium in an anode body according to an embodiment of the invention.
Figure 2:
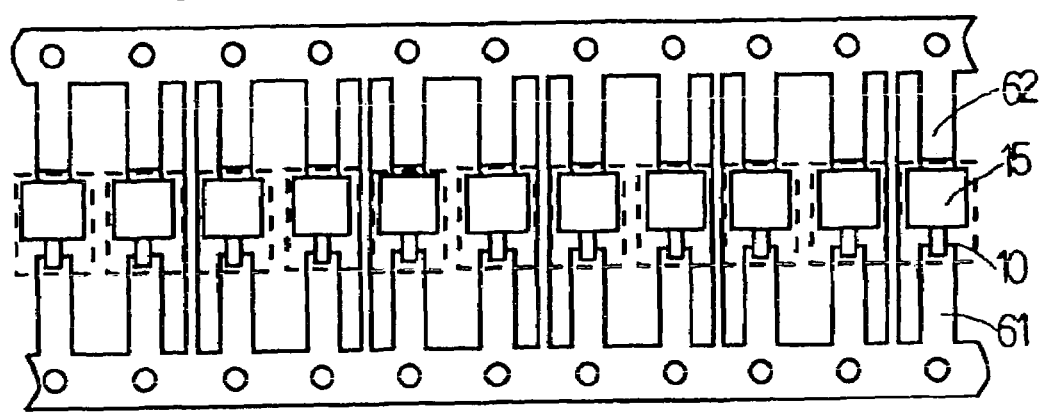
FIG. 2 is a plan view of the solid electrolytic capacitor at the injection molding step.

FIG. 1 shows a solid electrolytic capacitor according to an embodiment of the invention. A solid electrolytic capacitor was prepared by using a sintered body comprising niobium or an alloy containing niobium as the main component as anode body 1, chemically converting the surface thereof to construct capacitor element 15 by forming dielectric oxide film 2, solid state electrolyte layer 3 comprising a conductive inorganic material such as manganese dioxide or a conductive organic material such as TCNQ complex salt or conductive polymer, and cathode lead-out layer 4 made of a carbon layer or the like on the anode body surface, connecting anode lead member 61 implanted to an end of the anode body 1 with anode terminal 61, connecting cathode lead-out layer 4 with cathode terminal 62, setting the same in accordance with cavity 10 of a heated injection mold as shown in FIGS. 2 and 3, and injecting a liquid silicone resin and keeping the same for a certain period of time to cure to form sheath resin 7.

As described above, an embodiment of the invention is shown in FIG. 1. However, the shape is not restricted to it. Further, instead of the sintered anode body, a foil laminated anode body and the like may be usable.

The silicone resin includes a "liquid resin" and a "solid resin." They have polymerization degrees of polymer different from each other. The "liquid resin" for use in the invention includes those having an average molecular weight of about 100 to about 7000, and the "solid resin" includes those having an average molecular weight of 10000 or more. In this connection, Hs (JIS K 6301 spring system A type) is used as the unit of post solidification hardness. Hereinafter, Examples of the invention will be shown.

EXAMPLE 1

A capacitor element was formed by chemically converting an element prepared by sintering 60 mg of niobium powder having a CV product of 97000 μFV/g with an implantation niobium wire in an aqueous nitric acid solution at 45 V and then forming a solid state electrolyte layer constituted of polypyrrole and a cathode lead-out layer constituted of a carbon layer and silver paste layer in order, which was subjected to naked pre-aging at 125° C. and 10 V for 1.5 hours. Subsequently, the capacitor element was attached with an anode terminal and cathode terminal by a well-known way. The resultant was set in accordance with a cavity of an injection mold heated at 150° C. The injection mold was injected with a liquid silicone resin having a viscosity of 51000 poise (hereinafter, represented as P) and post solidification hardness of 71 Hs over 5 seconds with 10 atm, which was held for 20 sec to cure to form a sheath resin. Thus, a niobium solid electrolytic capacitor of 100 μF/10V was prepared. Although the liquid silicone resin has a high viscosity at ordinary temperatures, it becomes of a low viscosity at the injection molding through contacting the mold at high temperatures to make injection at 10 atm and molding possible with no trouble at all.

EXAMPLE 2

A niobium solid electrolytic capacitor was prepared by the same way as in Example 1, except for setting a capacitor element in an injection mold heated at 120° C., injecting a flame-resistant liquid silicone resin having a viscosity of 7000 P and a post solidification hardness of 55 Hs over 5 seconds with 10 atm to be held for 100 seconds to cure, at aforementioned injection molding.

EXAMPLE 3

A niobium solid electrolytic capacitor was prepared by the same way as in Example 1, except for attaching the capacitor element with an anode terminal and cathode terminal followed by dipping in polyimide silicone SMP-2001 (made by Shin-Etsu Chemical) to form an undercoating on the surface of the capacitor element, then, conducting a primer treatment to the capacitor element, anode terminal and cathode terminal, and then injecting a liquid silicone resin having a viscosity of 6100 P and post solidification hardness of 79 Hs.

COMPARATIVE EXAMPLE 1

A solid electrolytic capacitor was prepared in the same way as in Example 1, except for setting the capacitor element in the injection mold heated at 180° C., and injecting a solid epoxy resin with 140 atm to be held for 2 minutes for curing at the injection molding.

COMPARATIVE EXAMPLE 2

A solid electrolytic capacitor was prepared in the same way as in Example 1, except for setting the capacitor element in the injection mold heated at 180° C., and conducting the injection with a reduced pressure of 80 atm, which was the lowest limit necessary for preventing generation of void, to be held for 2 minutes for curing at the injection molding.

COMPARATIVE EXAMPLE 3

A solid electrolytic capacitor was prepared in the same way as in Example 1, except for setting the capacitor element in the injection mold heated at 60° C., and injecting a liquid urethane resin having a viscosity of 11 P with 10 atm to be held for 10 minutes to cure to form a sheath resin.

In Examples 1 to 3 and Comparative examples 1 to 3, a leakage current (LC) was measured after the naked pre-aging as a first measurement. Then, after the injection molding, the leakage current (LC) was measured as a second measurement. Subsequently, an aging was conducted at 105° C. and 10 V for 1 hour. Then, a capacitance, equivalent series resistance (ESR) and leakage current (LC) were measured respectively as a third measurement. The value of the leakage current (LC) was determined while applying 10 V for 5 minutes, and the value of the equivalent series resistance (ESR) was determined at 100 KHz. The value is the average value for 20 samples respectively measured at 20° C.; but as for the value of the second leakage current (LC) after the injection molding, only the digit number is shown instead of the average value since it varied widely. These results are represented in Table 1 below.

TABLE 1

|  | After naked pre-aging LC (μA) | After injection molding and before aging (μA) LC (μA) | After injection molding and after aging | | |
|---|---|---|---|---|---|
|  |  |  | Capacitance (μF) | ESR (mΩ) | LC (μA) |
| Example 1 | 1.7 | $10^1$ | 114 | 33.3 | 1.7 |
| Example 2 | 2.0 | $10^0$ | 114 | 33.0 | 1.3 |
| Example 3 | 3.0 | $10^0$ | 114 | 32.9 | 2.5 |
| Comparative example 1 | 3.0 | $>10^3$ | 115 | 33.2 | 560 |
| Comparative example 2 | 2.1 | $>10^3$ | 114 | 33.5 | 128 |
| Comparative example 3 | 3.5 | $10^0$ | 115 | 32.0 | 1.8 |

By comparing with the fact that leakage current of a polymer cathode tantalum capacitor with the same rating according to EIAJ standard (RC-2378-101) is defined as 100 μA or less, it can be seen that the final leakage current values (leakage current value of "After injection molding and after aging") of respective Examples in the table are sufficiently low. From the comparison of Example 1 with Example 2, it can be seen that, in "After injection molding and before aging," leakage currents differ slightly from each other due to the difference of the molding temperature, but that the difference disappears through the aging to allow both of them to fall on a practical level satisfactorily. As shown in Comparative examples 1 and 2, in the case of the usual method using a solid epoxy resin, the initial (after the naked pre-aging) leakage current level cannot be recovered even when the aging is performed after molding not to allow the leakage current to fall in a practical level. Decreasing the injection pressure to the lower limit where a void did not generate could not result in a large improvement. The reason may be that a solid resin has a high molten viscosity and is forced to be injected with a high pressure to give the element a large mechanical damage due to collision of the resin and, further, it has a high curing temperature to give the dielectric coating film a large disturbance of order at the atomic level having a lasting effect to prevent recovery of the initial (after the naked pre-aging) leakage current even when the aging is performed and not to allow the leakage current to fall on a practical level.

In the case of Comparative example 3 using the liquid urethane resin, a damage at injection with a low viscosity is small and curing can be also performed at a low temperature, therefore an molding damage is extremely small. Thus, there is perfectly no problem as far as the initial properties are concerned.

Next, a solder heat resistance test was conducted by using samples in the Examples 1 to 3 and Comparable example 3 in which good finished products were obtained. Conditions of the solder heat resistance test were determined pursuant to EIAJ RC-2378 (Surface mounting tantalum solid conductive polymer capacitor), i.e., 2 levels as shown in Table 2 below were selected.

TABLE 2

|  | Preheating temperature | High heat holding temperature |
|---|---|---|
| Lead solder level | 150° C. × 120 sec | 200° C. × 25 sec |
| Lead-free solder level | 160° C. × 120 sec | 230° C. × 25 sec |

Actual measurement values of the leakage current before (initial value) or after (here, post treatment period of time: 96 hours) conducting the solder heat resistance test of the aforementioned 2 levels are shown in Table 3 below.

TABLE 3

|  | Leakage current (μA) | | |
|---|---|---|---|
|  | Initial value | Lead solder level After test | Lead-free solder level After test |
| Example 1 | 1.5 | 7.9 | 18 |
| Example 2 | 1.7 | 6.5 | 16 |
| Example 3 | 2.6 | 5.9 | 19 |
| Comparative example 3 | 1.6 | 28 | 670 |

As an evaluation criterion for the leakage current after the solder heat resistance test, "within the initial standard" (in this case, 100 μA or less) is a target. In the case of Comparative example 3 also, the leakage current is within the initial standard for the lead solder level and at a practical level indeed; but for lead-free solder level, it runs over the initial standard substantially and a practical trouble is apprehended. On the contrary, the results of Examples 1 to 3 can be also applied to the lead-free solder level. This large difference may be derived from presence or absence of elasticity of the cured resin. Hardness of silicone resin is 0.01 to 0.1 N/mm$^2$ when represented in terms of the tensile elastic modulus, which is smaller than that of epoxy resin, 2000 to 5000 N/mm$^2$, and urethane resin, 70 to 3000 N/mm$^2$, by 3 digits or more. Therefore, it is believed that the silicone resin can absorb elastically expansion and contraction of the element caused by thermal loading; and that, on the contrary, in the case of urethane resin, the element is applied with a strong force to give the dielectric coating film a damage.

The post solidification hardness of the liquid silicone resin for use in the invention is preferably 45 Hs or more, more preferably 70 Hs or more. The liquid silicone resin has inherently a flexibility so that the element is not damaged. Although the hardness can be adjusted by varying a cross-link density or addition amount of a filler, hardness of 45 Hs or less is too soft and force or vibration applied to a terminal fitting may be transmitted to the element to damage the element.

Further, it is preferable that a primer treatment is conducted before the injection molding step, in which a primer agent is coated to the capacitor element or at least one of the anode and cathode terminal. By doing so, it is possible to improve a bonding force between the liquid silicone resin and the capacitor element or the anode and cathode terminal to increase vibration resistance and mechanical strength.

Furthermore, by using a liquid silicone resin added with a flame retardant agent such as metal hydroxide, flame resistance can be improved. As the flame retardant agent, phosphate ester-series (such as triphenyl phosphate), halogenated-series (such as hexabromobenzene, halogenated polyethylene), antimony-series (such as Sb406), or, in addition, bromine, borax, zirconium oxide or the like is used.

For the sample of Example 1, a humidity test was conducted under conditions of 60° C., 90 to 95%, which is a humidity 2.7 folds higher than that in JIS standard, and 500 hours to measure the capacity variation rate, tangent of loss angle (tan δ) and leakage current. The results are shown in Table 4 below.

TABLE 4

|  | Initial value | After humidity test |
|---|---|---|
| Capacity variation rate (%) | — | +6.7 |
| tanδ | 0.0272 | 0.0285 |
| Leakage current (μA) | 6.4 | 6.0 |

As can be seen from Table 4, capacitor properties do not change widely after the humidity test to obtain an excellent moisture resistance.

The present applicant tried to form a sheath resin constituted of a liquid silicone resin for a capacitor element using tantalum as an anode body. However, good capacitor properties could not be obtained. This may be attributed to the fact that silicone resin has a lower moisture resistance compared with epoxy resin and the like, and that use of it for an anode body made of tantalum susceptive to the effect of moisture degenerates moisture resistance as a solid electrolytic capacitor completed product to a large extent. On the contrary, the applicant found, as the result of repeated experiments, a characteristic that a capacitor element using niobium as an anode body is not susceptible to the effect of moisture. On the basis of the characteristic, by combining the anode body constituted of niobium and the sheath resin constituted of liquid silicone resin, the advantages of moisture resistance and elasticity could be exploited skillfully to obtain good capacitor properties.

In addition, it was confirmed through a heat resistance test that the niobium solid electrolytic capacitor sheathed with a liquid resin could be usable satisfactorily at a working temperature of up to 85° C. When ensuring a temperature higher than 85° C., it is preferable to use an auxiliary means at the same time such as forming an under coating and then forming a sheath resin constituted of a liquid silicone resin, as shown in Example 3. As material used for the under coating, one having a post solidification hardness of 90 Hs or more and scarcely allowing gas to penetrate is preferable. Because, when a conductive organic material such as TCNQ complex or conductive polymer is used as the solid state electrolyte layer, decomposition of the organic semiconductor by the reaction of the organic semiconductor with a gas such as oxygen is prevented under a working temperature of 85° C. or higher.

The invention claimed is:

1. A solid electrolytic capacitor comprising:
    an anode body comprising niobium or an alloy containing niobium as the main component to an end of which an anode lead member is implanted;
    a capacitor element constituted by forming a dielectric coating film, a solid state electrolyte layer and cathode lead-out layer in order on a surface of the anode body;
    anode terminal connected to the anode lead member;
    a cathode terminal connected to the cathode lead-out layer;
    a sheath resin covering and sealing the capacitor,
    wherein the sheath resin is formed by injecting a liquid silicone resin into a mold and filling the mold with the liquid silicone resin, and heat curing at the mold, and a flame retardant is added to the liquid silicone resin.

2. The solid electrolytic capacitor according to claim 1, wherein a post solidification hardness of the liquid silicone resin is 45 Hs or more.

3. The solid electrolytic capacitor according to claim 1, wherein the capacitor element or at least one of the terminals is subjected to a primer treatment before the injection molding step.

4. The solid electrolytic capacitor according to claim 2, wherein the capacitor element or at least one of the terminals is subjected to a primer treatment before the injection molding step.

5. A solid electrolytic capacitor manufacturing method comprising the steps of:
    forming a dielectric coating film, a solid state electrolyte layer and cathode lead-out layer in order on the surface of an anode body comprising niobium or an alloy containing niobium as the main component to an end of which an anode lead member is implanted to construct a capacitor element,
    connecting the anode lead member with an anode terminal and
    connecting the cathode lead-out layer with a cathode terminal,
    placing the capacitor element in a cavity of a mold,
    heating a liquid silicone resin, and
    injecting the liquid silicone resin into the mold and filling the mold with the liquid silicone resin, and heat curing at the mold, wherein the liquid silicone resin has an average molecular weight of about 100 to 7000.

* * * * *